US006299227B1

(12) United States Patent
Kröning et al.

(10) Patent No.: US 6,299,227 B1
(45) Date of Patent: Oct. 9, 2001

(54) IMPACT DAMPING MEMBER FOR MOTOR VEHICLES

(75) Inventors: Achim Kröning, Paderborn; Georgios Leotaris, Paderborn-Wewer, both of (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/500,005

(22) Filed: Feb. 8, 2000

(30) Foreign Application Priority Data

Sep. 9, 1999 (DE) .............................. 199 43 207

(51) Int. Cl.[7] ................................. B60R 19/26
(52) U.S. Cl. ..................... 293/132; 293/133; 293/155
(58) Field of Search ................... 293/132, 133, 293/134, 135, 136, 155

(56) References Cited

U.S. PATENT DOCUMENTS

| 4,200,310 | * | 4/1980 | Carney, III | 293/132 X |
| 5,265,925 | * | 11/1993 | Cox et al. | 293/132 X |
| 5,492,207 | * | 2/1996 | Clausen | 188/377 |
| 5,823,584 | * | 10/1998 | Carney, III | 293/102 |

FOREIGN PATENT DOCUMENTS 298 08 143 U1 9/1998 (DE).

* cited by examiner

*Primary Examiner*—Joseph D. Pape
*Assistant Examiner*—Lori L. Coletta
(74) *Attorney, Agent, or Firm*—Friedrich Kueffner

(57) ABSTRACT

An impact damping member for motor vehicles, mounted as a safety member between a bumper element and a frame of the motor vehicle, has an outer tube having a longitudinal axis positioned perpendicularly to the bumper element and the frame. An inner profiled member is arranged inside the outer tube. The inner profiled member has several hollow bodies connected to one another, and each has a longitudinal axis extending transversely to the longitudinal axis of the outer tube. A first one of the hollow bodies next to the bumper element is penetrated by a coupling member that connects the impact damping member to the bumper element by penetrating the first hollow body and by being attached to the bumper element.

13 Claims, 1 Drawing Sheet

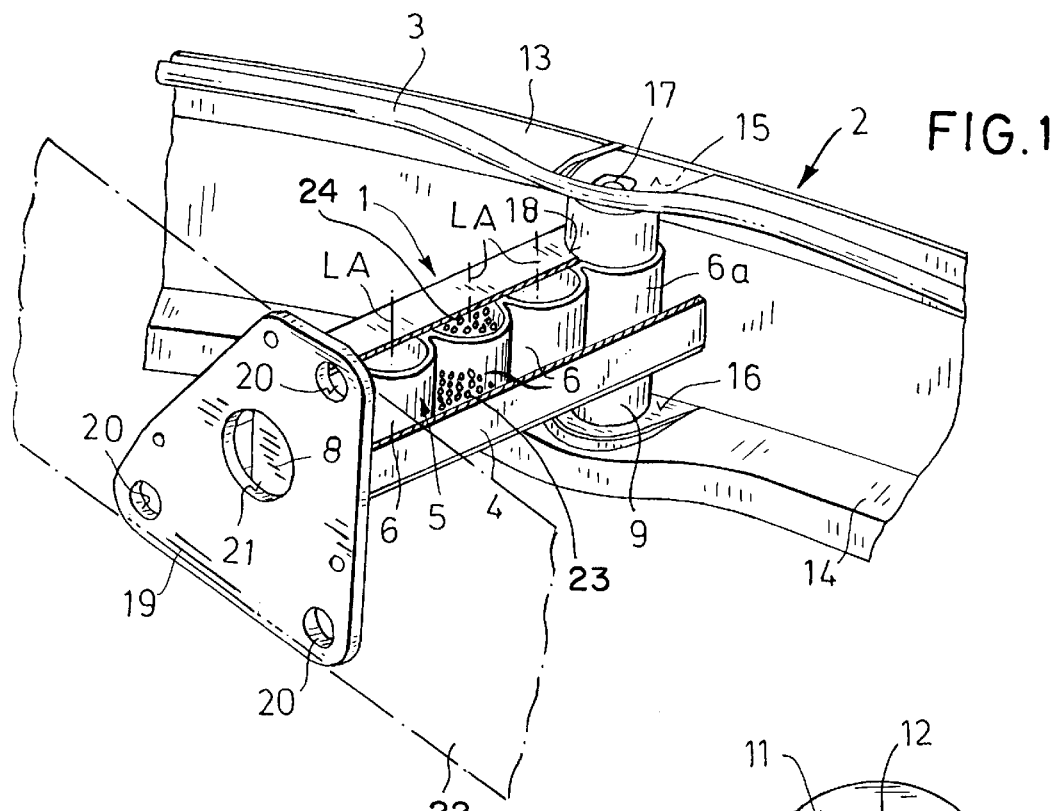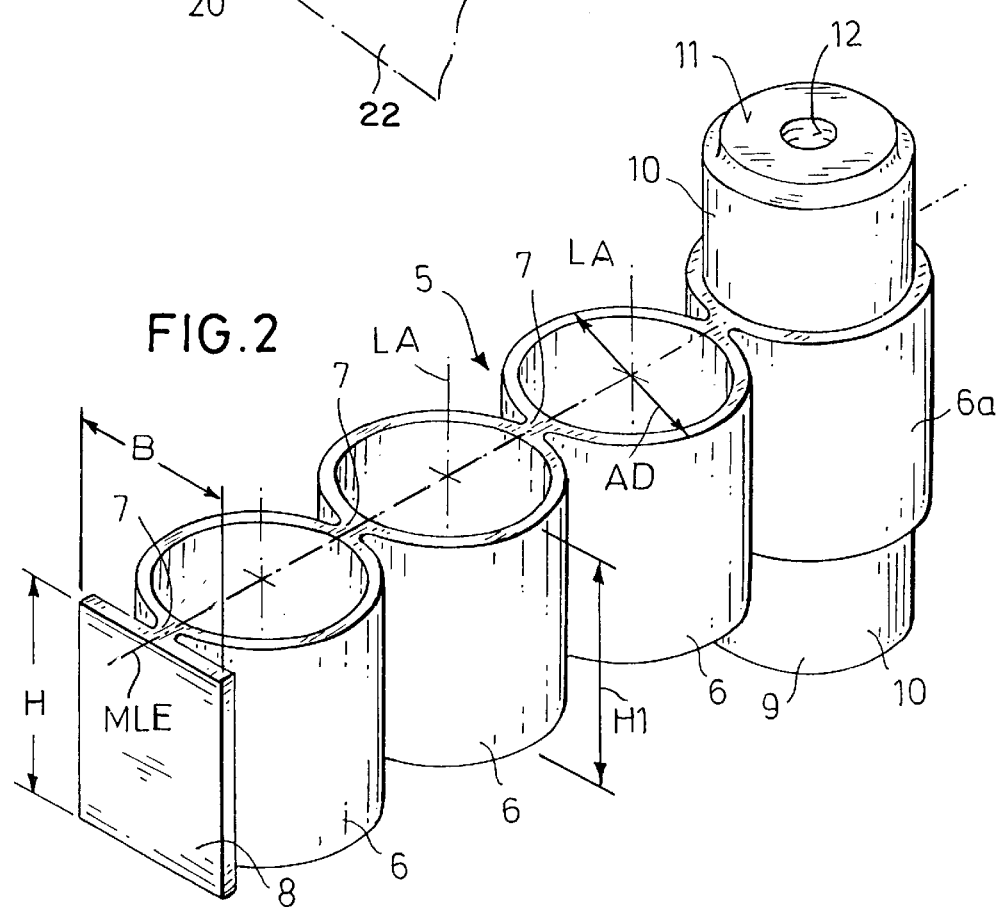

IMPACT DAMPING MEMBER FOR MOTOR VEHICLES

BACKGROUND OF THE INVENTION

1. Field of the Invention

The invention relates to an impact damping member for motor vehicles arranged as a safety member between the bumper element and the frame of the motor vehicle. The impact damping member absorbs energy by deformation during a collision of the motor vehicle with an obstacle.

2. Description of the Related Art

A prior art impact damping member for motor vehicles is disclosed in German patent document 298 08 143 U1. It is arranged as a safety member between a bumper element and the frame of the motor vehicle and is comprised of an extruded inner profiled member supported inside an outer tube. The outer tube and the inner profiled member deform upon impact to thereby absorb the impact energy. A portion of the length of the impact damping member has a truss structure and is thus relatively rigid. Furthermore, the holding device for attachment to the bumper element is designed for only a certain type of bumper element.

The primary objective of providing a motor vehicle with bumper elements and impact damping members is to protect the passengers in the vehicle and to prevent damage to the frame in order to avoid expensive repairs of the vehicle. It is essential in this context to design the impact damping member in a way that is beneficial with regard to production engineering aspects and such that it is as light as possible, while fulfilling certain minimum requirements with regard to its energy absorption capacity.

A lightweight construction results in a reduction of fuel consumption and accompanying pollutant emissions. At the same time, the impact damping members must have sufficient stability with regard to safety-technological aspects in order to ensure the required buckle resistance in the longitudinal direction. The weight reduction thus has limits within which the material and construction parameters can be adjusted.

SUMMARY OF THE INVENTION

It is an object of the present invention to improve an impact damping member with respect to its energy absorption capacity and its weight and to further develop it with respect to its mounting technology.

In accordance with the present invention, this is achieved in that the impact damping member is provided with an inner profiled member which is supported in an outer tube and is comprised of several hollow bodies connected to one another and each having a longitudinal axis extending transversely to the outer tube, wherein the hollow body adjacent to the bumper element is penetrated by a coupling member connected to the bumper element.

Accordingly, the inner profiled member is characterized by having multiple hollow bodies connected to one another and the hollow body next to the bumper element being penetrated by a coupling member which is connected to the bumper element.

The hollow members of the inner profiled member have longitudinal axes which extend transversely to the longitudinal extension of the outer tube and are adjustable with respect to the configurational conditions such as, for example, the inner diameter of the outer tube, in an efficient and inexpensive manner by tailoring them accordingly. Essential for the configuration of an impact damping member is also a sufficient buckle resistance. This can be realized according to the inventive solution in that the inner profiled member is supported positive-lockingly within the outer tube. This results in an advantageous cooperation of these components.

Preferably, the hollow bodies have large hollow spaces so that the impact damping member has a correspondingly long deformation stroke and a large amount of impact energy can be transformed into deformation energy. Large hollow spaces provide for an especially soft deformation of the impact damping member. This advantageously provides protection already in a collision occurring at low speed.

The hollow bodies are connected to one another wherein one or more stays between neighboring hollow bodies may be provided. Technically especially beneficial is a stay which is arranged in the longitudinal center plane of the inner profiled member in which also the longitudinal axes of the hollow bodies are positioned. The mutual connection of the hollow bodies of the inner profiled member results in a fixed composite structure which is able to receive great transverse forces acting on the impact damping member by functional cooperation with the outer tube. An advantageous production engineering process for the inner profiled member is cutting to length an extruded profiled member blank.

The impact damping member is connected to the bumper element by a coupling member which penetrates the hollow body of the inner profiled member next to the bumper element. This feature realizes an especially simple attachment to the bumper element. Moreover, since the coupling member penetrates a hollow body of the inner profiled member, the hollow body and the inner profiled member are automatically position-oriented within the outer tube. Additional fastening elements for fixation of the inner profiled member are not required. The coupling member can be sized such that it penetrates the hollow body at least over portions thereof in a positive-locking manner so that introduced impact forces are transmitted optimally onto the inner profiled member.

An outer tube in the context of the invention means elongate hollow profiled members which have a hollow space for receiving the energy-absorbing inner profiled member. Suitable as an outer tube are also profiled members produced by stamped monocoque construction.

The coupling member can penetrate also the outer profiled member for positional fixation of the inner profiled member. For this purpose, the outer tube has penetrations which are matched to the cross-section of the coupling member so that attack forces are advantageously directly transmitted from the coupling member onto the outer tube. The outer tube preferably has a rectangular cross-section.

According to another preferred embodiment, the bumper element is connected to the impact damping member by at least one threaded bolt extending in the longitudinal direction of the coupling member. It is possible to screw one threaded bolt into each end face of the coupling member. However, it is also possible to provide a longer threaded bolt which penetrates the entire length of the coupling member. Corresponding through bores are then provided in the coupling member.

In principle, the hollow body adjacent to the bumper element and the coupling member are fixedly connected to one another. Alternatively, it is possible to configure the hollow body next to the bumper element and the coupling member penetrating it such that they are movable relative to one another. In this way, the inventive impact damping member is adjusted with these production engineering aspects to the different assembly situations.

Hollow bodies having of round, oval, or polygonal cross-section have an especially high energy absorption capacity, and round hollow bodies are especially expedient in this context. When the coupling member is moveably arranged within the hollow body at the bumper element, a round cross-section is especially expedient for the hollow body as well as the coupling member.

The longitudinal axes of the hollow bodies and thus also the longitudinal axis of the hollow body adjacent to the bumper element extend transversely to the longitudinal direction of extension of the impact damping member. In a preferred embodiment, the longitudinal axes of the hollow bodies extent vertically. However, any other orientation of the longitudinal axes of the hollow bodies is basically conceivable.

For connecting the impact damping member to the frame of the vehicle, the outer tube is provided with a flange which can be secured to the frame. The flange can be connected by material bonding, for example, by welding, to the outer tube, but also by a frictional connection such as screwing. However, a positive-locking connection such as a penetration connection is also possible for connecting the outer tube to the flange. In order to be able to easily exchange the impact damping member after a collision, the flange is preferably secured to the frame by screwing.

In an advantageous embodiment the inner profiled member can have a support plate which contacts the flange. The function of the support plate is to uniformly distribute the forces acting on the inner profiled member via the bumper element and to introduce them into the flange which acts as an abutment.

A further improvement of the deformation behavior and energy absorption capability is ensured when at least partially a visco-elastic filling is provided between the outer tube and the inner profiled member and/or within the inner profiled member. Especially effective is a filling of the hollow bodies of the inner profiled member. Plastic material as well as plastic foams are especially suitable as visco-elastic filling materials.

The inner profiled member and/or the outer tube are preferably comprised of a light metal alloy, preferably and aluminum alloy, for example, AlMgSi. Independent of this, several further material combinations are possible in order to design the deformation behavior of the inventive impact damping member in a linear, progressive, or degressive manner. In the context of the invention it is possible to produce the outer tube and the inner profiled member as plastic elements which have a sufficient energy absorption capability. Also, a hybrid configuration using several different materials is possible, for example, a combination of plastic components and metal components.

Further parameters for optimizing the deformation behavior are variations of the wall thickness of the outer tube, wherein the walls of the outer tube can also be provided with openings. For the purpose of providing an optimal energy absorption of the inventive impact damping member, the wall thickness of the hollow bodies of the inner profiled member can also be varied with beneficial effects.

BRIEF DESCRIPTION OF THE DRAWING

In the drawing:

FIG. 1 shows in a perspective representation, partially in section, the impact damping member according to the present invention connected to a bumper element; and FIG. 2 is a perspective representation of an extruded inner profiled member with a coupling member.

DESCRIPTION OF THE PREFERRED EMBODIMENTS

The impact damping member 1 shown in FIG. 1 for motor vehicles is a safety member positioned between the bumper element 2 and a frame 22 (shown schematically in dash-dot lines) of a motor vehicle. The bumper element 2 extends transversely across the front or rear of a motor vehicle and is comprised of a plastic shell and a transverse bumper support 3 providing the support structure. In the shown embodiment only the longitudinal portion of the transverse bumper support 3 connected to the impact damping member 1 is represented in order to facilitate understanding of the drawing.

The impact damping member 1 comprises a rectangular outer tube 4 in which an extruded inner profiled member 5 is supported. The inner profiled member 5 is comprised of adjacently arranged cylindrical hollow bodies 6 which are connected to one another.

The hollow bodies 6 have vertically extending parallel longitudinal axes LA which are thus positioned transversely to the longitudinal extension or axis of the outer tube 4. The hollow bodies 6 are connected to one another by stays 7 which extend in the longitudinal center plane MLE of the inner profiled member 5 (FIG. 2). FIG. 2 shows also that the inner profiled member 5 has a rectangular support plate 8 at the side opposite the bumper element 2. The support plate 8 is connected by a stay 7 to the adjacently positioned hollow body 6. The width B of the support plate 8 corresponds to the outer diameter AD of the hollow bodies 6 and its height H to the height H1 of the hollow bodies 6.

The hollow body 6a positioned adjacent to the bumper element 2 is positive-lockingly penetrated by a coupling member 9. The coupling member 9 projects with its ends 10 from either side of the hollow body 6a and is provided at its end faces 11 with a central threaded bore 12, respectively.

FIG. 1 shows how the coupling member 9 engages between upper and lower legs 13, 14 of the bumper support 3 having a hat-shaped cross-section. The coupling member 9 is coupled with its parallel contact surfaces 15, 16 to the legs 13, 14 of bumper element 3. A threaded bolt 17 penetrates respectively the contact surface 15 or 16 and engages the threaded bore 12 of the coupling member 9.

In the mounted position, the coupling member 9 penetrates the inner profiled member 5 as well as the corresponding penetrations 18 provided in the outer tube 4. By this measure, the inner profiled member 5 is position-secured in the outer tube 4.

At its end opposite the bumper elements 2 the impact damping member 1 has a flange 19 which is connected to the outer tube 4. The flange 19 is located in the same plane as the support plate 8 of the inner profiled member 5. The surface area of the support plate 8 contacts the flange 19. The flange 19 is provided with several bores 20 for securing it by screwing to the frame of the motor vehicle. These bores 20 are positioned within the corner areas of the substantially trapezoidal flange 19. Moreover, the flange 19 has an opening 21 at its central area.

While the inner profiled members 5 as well as the outer tube 4 have a relatively minimal wall thickness, the flange plate 19 has a greater wall thickness. The wall thickness of the inner profiled member 5 as well as of the outer tube 4 are constant in the shown embodiment.

The coupling member 9 can be embodied as a hollow body in order to reduce weight.

A visco-elastic filling 23 maybe disposed at least in some areas between the outer tube 4 and the inner profiled member 5. In addition, visco-elastic filling 24 maybe disposed at least in some areas within the inner profiled member 5.

While specific embodiments of the invention have been shown and described in detail to illustrate the inventive principles, it will be understood that the invention may be embodied otherwise without departing from such principles.

What is claimed is:

1. An impact damping member system for motor vehicles configured to be mounted as a safety member between a bumper element and a frame of the motor vehicle, the impact damping member comprising:

an outer tube having a longitudinal axis positioned perpendicularly to the bumper element and the frame;

an inner profiled member system arranged in the outer tube;

a coupling member configured to connect the impact damping member to the bumper element and to be attached to the bumper element;

the inner profiled member comprised of several hollow bodies connected to one another and each having a longitudinal axis extending transversely to the longitudinal axis of the outer tube;

wherein a first one of the hollow bodies next to the bumper element is configured to be penetrated by the coupling member.

2. The impact damping member system according to claim 1, wherein the coupling member comprises one or more threaded bolts for fastening the coupling member to the bumper element, wherein the one or more threaded bolts extend in a longitudinal direction of the coupling member.

3. The impact damping member system according to claim 1, wherein the first hollow body and the coupling member system are moveable relative to one another.

4. The impact damping member system according to claim 1, wherein the one or more hollow bodies have a round or oval cross-section.

5. The impact damping member system according to claim 1, wherein the one or more hollow bodies have a polygonal cross-section.

6. The impact damping member system according to claim 1, wherein the longitudinal axes of the one or more hollow bodies are vertically positioned.

7. The impact damping member system according to claim 1, further comprising a flange fastened to the outer tube and configured to be connect ed to the frame of the motor vehicle.

8. The impact damping member system according to claim 7, wherein the inner profiled member has a support plate resting against the flange.

9. The impact damping member system according to claim 1, further comprising a visco-elastic filling disposed at least in some areas between the outer tube and the inner profiled member.

10. The impact damping member system according to claim 1, further comprising a visco-elastic filling disposed at least in some areas between the outer tube and the inner profiled member and within the inner profiled member.

11. The impact damping member system according to claim 1, further comprising a visco-elastic filling disposed at least in some areas within the inner profiled member.

12. The impact damping member system according to claim 1, wherein at least one of the inner profiled member system and the outer tube are comprised of a light metal alloy.

13. The impact damping member system according to claim 12, wherein the light metal alloy is AlMgSi.

\* \* \* \* \*